Patented Mar. 15, 1949

2,464,742

UNITED STATES PATENT OFFICE 2,464,742

SYNTHETIC ELASTOMERS FROM BRANCH-CHAIN HEXADIENE COPOLYMERS

Eugene T. Bishop, Berkeley, Calif., assignor to Shell Development Company, San Francisco, Calif., a corporation of Delaware No Drawing. Application June 20, 1944, Serial No. 541,283

8 Claims. (Cl. 260—80.7)

This invention relates to the co-polymerization of branch-chain 1,3-hexadienes with 1,3-dienes of 4 and 5 carbon atoms.

Homopolymers of 1,3-butadiene, isoprene and the like are dry, crumbly and of little value commercially. Co-polymers of 1,3-butadiene with styrene, acrylonitrile, isobutylene and the like are more satisfactory, but are difficult to mill, give trouble in plying-up and other fabricating operations, and yield vulcanizates having relatively poor physical properties. Co-polymers of 1,3-butadiene with minor amounts of other conjugated dienes exhibit little or no improvement over the homopolymers. In particular, previously produced co-polymers with 2-methyl-1,3-pentadiene and 4-methyl-1,3-pentadiene have many of the undesirable characteristics of homopolymers of 1,3-butadiene, even when relatively large amounts of the methylpentadienes are used. Elastomers produced by the polymerization of the stated methylpentadienes in the absence of other polymerizable unsaturated compounds more closely resemble natural rubber in milling and fabricating properties, but are hard to handle and have poor resilience and freeze-resistance. Further, the polymerization is slow and the production correspondingly expensive.

An object of the present invention is to provide new and improved synthetic elastomers. Another object is to provide a more efficient process of producing methylpentadiene polymers. Other objects will be apparent from the description of the invention given hereinafter.

These objects are accomplished in accordance with the present invention by the co-polymerization of 70% or more of a branch-chain 1,3-hexadiene (methylpentadienes) having a straight chain of 5 carbon atoms, or mixture of two or more of said hexadienes with 30% or less of a 1,3-diene of 4 to 5 carbon atoms or mixture of two or more such dienes. It has been discovered that co-polymers of these methylpentadienes with only such minor amounts of 4 and 5 carbon-atom dienes are notably superior to any of the homopolymers and to co-polymers with larger amounts of 4 and 5 carbon-atom dienes. It has been discovered also that the rate of polymerization of the methylpentadienes is markedly increased by the presence of only minor amounts of lower dienes such as 1,3-butadiene.

The methylpentadienes with which the invention is concerned are branch-chain 1,3-hexadienes having a straight chain of 5 carbon atoms, specifically, 2-methyl-1,3-pentadiene, 3-methyl-1,3-pentadiene and 4-methyl-1,3-pentadiene. A single methylpentadiene can be polymerized alone or two or more methylpentadienes can be polymerized in admixture with one another. It is preferred to employ a mixture of 2-methyl-1,3-pentadiene with 4-methyl-1,3-pentadiene, e. g. a mixture of about 85% of the former with about 15% of the latter, such as may be obtained by the dehydration of 2-methyl-2,4-pentanediol. If desired, any of the methylpentadienes may be used in the absence of the other.

Of the 4 and 5 carbon-atom 1,3-dienes, 1,3-butadiene is preferred by reason of its high rate of co-polymerization, and particularly of the quality of the resulting co-polymers. 5-carbon-atom 1,3-diene hydrocarbons may be used, including isoprene (2-methyl-1,3-butadiene), and piperylene (1-methyl-1,3-butadiene). One or more hydrogen atoms of the dienes may be substituted by halogen or the like. Mixtures of two or more 4 to 5 carbon-atom dienes may be used, particularly mixtures of 1,3-butadiene with isoprene. Small amounts of other polymerizable unsaturated compounds may be present.

Improved elastomers may be obtained by co-polymerizing the methylpentadienes with only very small amounts of 4 to 5 carbon-atom 1,3-dienes, e. g. about 5% by weight of the mixture of combined dienes. Amounts larger than about 30% should not be used. Preferred co-polymers are produced by co-polymerizing from about 75% to about 90% of the stated methylpentadienes with from about 25% to about 10 of 1,3-dienes of 4 to 5 carbon atoms.

The compounds may be polymerized in bulk in the substantial absence of diluents. The reaction is more easily controlled and the products more easily handled if an homogenizing agent is present during polymerization. Liquids which are solvents or non-solvents may be used, polymerization being effected in solution or dispersion, respectively. The method employed may be dependent upon the catalyst used. For instance, with catalysts sensitive to water, aqueous dispersions are unsatisfactory. Preferred polymerization catalysts are compounds which are stable, catalytically active and capable of dissociation into free radicals under the conditions employed. Among these are diazoaminoaryl compounds, such as diazoaminobenzene, ortho, meta and para diazoamino toluenes, the diazo amino xylenes, toluene azo benzyl amine (1-toluyl 3-benzyl triazene), 4-methyl dazo amino benzene (1-p-toluyl 3-phenyl triazene), para benzene azo tolu benzyl amine (1-(p-methyl diphenyl) 3-benzyl triazene), 5 diazo amino pseudo cumene, para toluene azo 5-pseudo cumidine, benzene azo para cuminyl amine, benzene azo tetrahydro naphthylamine, benzene diazo amino naphthalene, alpha and beta diazo amino naphthalenes and the like. The preferred polymerization catalyst is diazoaminobenzene, which in re-arranging to aminoazobenzene is believed to yield the free radicals

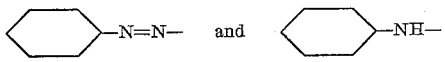

one or both of which initiate polymerization. An amount of diazoaminobenzene as small as about 1% by weight of the total amount of polymerizable compounds is satisfactory, although larger amounts, e. g. up to about 5% or more, can be used and smaller amounts, e. g. about 0.2%, or even less, are effective. The term "stable" as used herein with reference to catalysts designates substances which are sufficiently stable to maintain their catalytic activity throughout a major portion of the period required for the polymerization reaction under the particular conditions of the reaction.

When diazoaminobenzene and like compounds are used as catalysts, the temperature of the reaction mixture should be maintained at above about 65° C. Temperatures as high as about 90° C. may be used safely and are preferred since faster polymerization is obtained. Lower temperatures, e. g. from about 40° C. to about 65° C. may be employed.

Other catalysts may be used. Peroxides such as benzoyl peroxide, lauryl peroxide, tertiary butyl hydroperoxide (often called simply tertiary butyl peroxide), di(tertiary alkyl) peroxides such as di(tertiary butyl) peroxides, perborates, persulfates and other per compounds will promote polymerization, although with the methylpentadienes they are much less effective than diazoaminoaryl compounds. The peroxide catalysts are ordinarily most effective at temperatures below 75° C., e. g. from about 40° C. to about 65° C.

Polymerization in accordance with the invention may be effected in a continuous or batchwise manner. Superatmospheric pressures are ordinarily required, although in some cases atmospheric or reduced pressures may be used. Oxygen may be present, or the reaction mixture may be provided with a blanket of an oxygen-free inert gas such as nitrogen or carbon dioxide. Emulsifying agents, protective colloids, granulating agents, regulators, pH buffers, lubricants, antioxidants, etc. may or may not be present.

Following polymerization, the polymer may be precipitated or coagulated, if necessary, by known or special methods, separated from the remainder of the reaction mixture by filtration, centrifuging or the like, washed and dried. The polymer may be further purified by treatment, e. g. boiling, with dilute caustic, which removes fatty acids and other contaminants which may be present. Synthetic latex may be produced by suitable treatment of polymer produced by an aqueous emulsion method. The dispersion medium may be concentrated, or partly or wholly replaced by another medium. Synthetic latex may, of course, be produced also by suitably dispersing polymer which has been coagulated.

The polymers may be compounded with modifying substances such as those used with natural rubber. Compounding can be done in a Banbury mixer or on a roll mill, the desired substances being added, usually one at a time, as fast as efficient blending with the stock and the maintenance of operable working consistency permit.

Representative examples of plasticizers which may be used are:

| | |
|---|---|
| Wood rosin | Cumarone resins |
| Gum rosin | Tricresyl phosphate |
| Ester gum | Chlorinated tricresyl phosphate |
| Alkyd resins | |
| Phenol-aldehyde resins | Alkoxy alkyl phosphates |
| Shellac | Tributoxy ethyl phosphate |
| Dibutyl sebacate | |
| Dibutyl phthalate | Dibenzyl ether |
| Dicapryl phthalate | Triacetin |
| Dioctyl phthalate | Stearic acid |
| Coal tar | Lauric acid |

Other plasticizers are suitable.

Tackifiers may be present. Among the common tackifiers are higher unsaturated cyclic ketones and hydrogenation products thereof, resins produced by reacting higher ketones with aldehydes, and hydrocarbon substances of the type exemplified by the unsaturated hydrocarbon product obtained from lubricating oil acid sludge.

Antioxidants may be present. The most common antioxidant is phenyl beta-naphthyl amine. Other antioxidants include para-hydroxy diphenyl, hydro-quinone, para-amino phenol, para,para'-diamino diphenylmethane, 2,4-n-toluylene diamine, diphenylamine, ortho-ditolylamine, para-ditolylamine, phenyl alpha-naphthyl amine, phenyl beta-naphthyl nitrosoamine, sym-di-beta-naphthyl para-phenylene diamine, diphenyl diamino ethane and 2,4-diaminodiphenylamine.

Carbon black and other fillers and pigments may be present. In tire manufacture channel black is the preferred reinforcing pigment. Semi-reinforcing black, thermatomic black, acetylene black and the like may be used. Mineral pigments such as clay, calcium silicate, iron oxide, chromium oxide, zinc oxide, titanium dioxide, etc. may be used.

In the production of vulcanizable compositions, one or more vulcanizing agents are usually added. Sulfur is the preferred vulcanizing agent. Other agents used, generally with less success, are sulfur-containing compounds, such as sulfur dioxide, hydrogen sulfide, thiuram disulfides, tetrasulfides and sulfur thiocyanate; oxygen and oxygen-yielding compounds, such as ozone, organic and inorganic peroxides; selenium, halogens and halogen-containing compounds, and; nitrogen-containing compounds, such as the nitrobenzenes.

Vulcanization accelerators may be present. Illustrative examples of accelerators are tetramethyl thiuram disulfide, zinc dibutyl dithiocarbamate, tetramethyl thiuram monosulfide, dipentamethylene thiuram tetrasulfide, mercapto benzo thiazole, hexamethylene-tetramine, aldehyde-ammonia, diphenylguanidine, diphenylthiourea, benzo thiazyl disulfide, piperidinium pentamethylene-dithiocarbamate, di-o-tolylguanidine triphenylguanidine and lead dimethyldithio-carbamate.

In addition to, or instead of, the modifiers already mentioned the compositions may contain dyes, stabilizers, lubricants, tackifiers, thickening agents, and the like. They may be mixed with plastic substances of many kinds, many of the plastics acting as plasticizers. Examples of plastic modifiers are natural resins, thermosetting condensation-type synthetic resins such as phenol-aldehyde, urea-aldehyde and many alkyd resins, resins produced by the polymerization and co-polymerization of unsaturated compounds such as those listed hereinabove, protein plastics, cellulose derivatives and the like. In some cases, the modifying plastics may be produced in situ in the presence of the polymethyl pentadienes. These and other modifiers may often be present during the polymerization reaction.

The co-polymers may be blended with natural, synthetic or reclaimed rubber. Small amounts of latex or crude rubber of Hevea or the like increase the adhesiveness of the compositions. Synthetic rubber modifiers include polymers of 1,3-butadiene, isoprene, piperylene, 2,3-dimethyl-1,3-butadiene, chloroprene, the other 1,3-dienes, olefins such as isobutylene, co-polymers of 1,3-dienes with styrene, acrylonitrile and the like, co-polymers of isobutylene with a small amount of butadiene, high molecular weight polyesters, polyvinyl halides, olefin polysulfides and the like.

The co-polymers and compounded compositions containing them may be subjected to numerous shaping operations. Sheets may be produced by the use of roll mills such as calenders or, less usually by casting from solutions. Sheets, rods, tubes and coatings may be produced by continuous or discontinuous extrusion. Molded articles may be produced by operations using open or closed molds. The compositions may be applied to fibrous material such as fabric by calendering or by impregnation with a solution or emulsion.

Compositions containing a vulcanizing agent may be vulcanized at temperatures used in the vulcanization of natural rubber and of other elastomers, e. g. 50° C. to 200° C.

The new synthetic elastomers of the invention may be used for most of the purposes for which other synthetic and natural elastomers are used. They are valuable in the production of balloon coverings, umbrellas, raincoats, tents, table covers, shower curtains, garment bags, electrical insulation, friction tape, hose for the handling of aqueous mixtures, paints, etc., self-sealing fuel tanks, gaskets, belts for conveying and for the transmission of power, vibration dampeners, printer's rolls, printer's blankets, engraving plates, shoe soles and heels, aprons, gloves, gas masks, clothing resistant to the penetration of poisonous gases, tire tubes, tire casings and adhesives. They may be used as plasticizers and tackifiers.

The properties of the co-polymers may be modified by chemical or physical after-treatment in accordance with known or special methods.

Some of the many ways in which the invention may be practiced are illustrated by the following examples, in which parts are on a weight bases.

In each case 100 parts by weight of the mixture of methylpentadienes with butadiene or isoprene, together with diazoaminobenzene, 1 part, as catalyst, was emulsified in water, 180 parts, containing soap, 5.1 parts, as an emulsifying agent and polymerized sodium salts of alkyl naphthalene sulfonic acids as protective colloid. The emulsion was maintained at 90° C. for the indicated period, following which the emulsion was broken by the addition of an electrolyte. The precipitated co-polymer was washed and dried in the usual manner, then compounded by milling on cold rolls with the substances indicated. The compound was cured at 90° C. and subjected to the usual physical tests.

| Example No. | 1 | 2 | 3 | 4 | 5 | 6 | 7 | 8 | 9 |
|---|---|---|---|---|---|---|---|---|---|
| Butadiene, parts | 5 | 10 | 10 | 20 | | | 10 | 10 | |
| Isoprene, parts | | | | | 5 | 10 | | | 20 |
| MPD,[1] parts | 95 | 90 | 90 | 80 | 95 | 90 | 90 | 80 | 80 |
| Poly. time, hrs | 16 | 16 | 11 | 11 | 16 | 16 | 11 | 11 | 16 |
| Yield, per cent | 82 | 95 | 79 | 86 | 85 | 90 | 79 | 80 | 95 |
| Mooney plasticity | 3.5 | 4.7 | 7 | 19 | 12.9 | 2 | 6 | 0 | 1 |
| Compound recipe | A | B | A | A | B | B | B | A | B |
| Cure time, min | 90 | 30 | 90 | 60 | 20 | 30 | 20 | 90 | 30 |
| Tensile, p. s. i. | 2,180 | 1,600 | 2,180 | 2,300 | 1,990 | 1,860 | 1,930 | 2,030 | 1,700 |
| Elongation, per cent | 565 | 440 | 600 | 640 | 485 | 500 | 495 | 550 | 410 |
| 300% Modulus, p. s. i. | 910 | 1,070 | 930 | 900 | 1,000 | 1,000 | 970 | 1,000 | 1,180 |
| Permanent set, per cent | 30 | 15 | 30 | 32 | 26 | 28 | 28 | 35 | 22 |
| Tear, lbs./in | | | | 325 | | | 325 | 305 | |
| Shore hardness | | | | 58 | | | 67 | 62 | |
| Rebound, per cent at— | | | | | | | | | |
| R. T | | | | 14 | | | <8 | 8 | |
| 100° C | | | | 47 | | | 45 | 45 | |
| T-50 [2] | −0.5 | −8 | −5 | −13 | +3.5 | −1 | −1.5 | −6.5 | −5.5 |

[1] Mixture of about 85% of 2-methyl-1,3-pentadiene with about 15% of 4-methyl-1,3-pentadiene.
[2] For natural rubber the T-50 test is well known as a measure of cure. For synthetic rubber, the test is independent of state of cure and is a measure of stiffening temperature.

EXAMPLE 10

1,3-butadiene, 5 parts, is co-polymerized with 95 parts of the mixture of methylpentadienes used in Example 1. The dienes are emulsified in 250 parts of a 5% solution of soap in water containing dissolved therein 1% of $Na_3PO_4 \cdot 12H_2O$ and 2.6% of potassium persulfate. To the emulsion are added hexachloroethane, 3 parts, and amyl alcohol, 0.2 part. The emulsion is held at 60° C. for several days. The co-polymer obtained is similar to that of Example 1.

The following compounding recipes were used in Examples 1–9, above:

*Compound recipes*

| | A | B |
|---|---|---|
| | Parts | Parts |
| Polymer | 100 | 100 |
| Carbon black | 50 | 50 |
| Softener (an intermediate coal tar fraction) | 5 | 5 |
| Zinc oxide | 5 | 5 |
| Mercaptobenzothiazole | 1.5 | 1.5 |
| Tetramethylthiuram disulfide | | 0.4 |
| Sulfur | 2 | 2 |

The term "polymerization" is used herein in a generic sense to cover the polymerization of a single monomeric polymerizable compound (which is specifically termed "homopolymerization"), or the simultaneous polymerization of two or more different monomeric polymerizable substances (which is specifically termed "co-polymerization"). The term "polymer" is inclusive of both the products of homopolymerization and of co-polymerization. "Unsaturated" refers to carbon-to-carbon unsaturation.

I claim as my invention:

1. A copolymer prepared by copolymerizing from 5% to 20% of an open-chain 1,3-diene hydrocarbon of 4 to 5 carbon atoms, inclusive, with from 95% to 80% of a mixture consisting of 85% 2-methyl-1,3-pentadiene and 15% 4-methyl-1,3-pentadiene in the absence of any other polymerizable compound.

2. A copolymer prepared by copolymerizing from 5% to 20% of 1,3-butadiene with from 95% to 80% of a mixture consisting of 85% 2-methyl-1,3-pentadiene and 15% 4-methyl-1,3-pentadiene in the absence of any other polymerizable compound.

3. A copolymer prepared by copolymerizing from 5% to 20% of isoprene and 95% to 80% with a mixture consisting of 85% 2-methyl-1,3-pentadiene and 15% 4-methyl-1,3-pentadiene in the absence of any other polymerizable compound.

4. A process for improving the polymerization of a mixture of 2-methyl-1,3-pentadiene and 4-methyl-1,3-pentadiene which comprises polymerizing 95% to 80% of a mixture consisting of 85% 2-methyl-1,3-pentadiene and 15% 4-methyl-1,3-pentadiene with from 5% to 20% of an open-chain 1,3-diene hydrocarbon of 4 to 5 carbon atoms, inclusive, in the absence of any other polymerizable compound.

5. A process for improving the polymerization of a mixture of 2-methyl-1,3-pentadiene and 4-methyl-1,3-pentadiene which comprises polymerizing 95% to 80% of a mixture consisting of 85% 2-methyl-1,3-pentadiene and 15% 4-methyl-1,3-pentadiene with from 5% to 20% of 1,3-butadiene in the absence of any other polymerizable compound.

6. A copolymer prepared by copolymerizing 20% of 1,3-butadiene with 80% of a mixture consisting of 85% 2-methyl-1,3-pentadiene and 15% 4-methyl-1,3-pentadiene in the absence of any other polymerizable compound.

7. A process for improving the polymerization of a mixture of 2-methyl-1,3-pentadiene and 4-methyl-1,3-pentadiene which comprises polymerizing 95% to 80% of a mixture consisting of 85% 2-methyl-1,3-pentadiene and 15% 4-methyl-1,3-pentadiene with from 5% to 20% of isoprene in the absence of any other polymerizable compound.

8. A copolymer prepared by copolymerizing 20% of isoprene with 80% of a mixture consisting of 85% 2-methyl-1,3-pentadiene and 15% 4-methyl-1,3-pentadiene in the absence of any other polymerizable compound.

EUGENE T. BISHOP.

REFERENCES CITED

The following references are of record in the file of this patent:

UNITED STATES PATENTS

| Number | Name | Date |
|---|---|---|
| 1,062,913 | Hofmann et al. | May 27, 1913 |
| 1,074,432 | Hofmann et al. | Sept. 13, 1913 |
| 2,313,233 | Fryling | Mar. 9, 1943 |
| 2,414,012 | Boord | Jan. 7, 1947 |

OTHER REFERENCES

Bachman et al., J. Am. Chem. Soc. Vol. 64, 787–790 (1942).